(12) United States Patent
Zeng

(10) Patent No.: US 9,143,773 B2
(45) Date of Patent: Sep. 22, 2015

(54) VIDEO SIGNAL FAULT DETECTION SYSTEM CAPABLE OF INFERENCE OF ABNORMAL COMPONENTS

(71) Applicant: INSTITUTE FOR INFORMATION INDUSTRY, Taipei (TW)

(72) Inventor: Yi-Chong Zeng, Keelung (TW)

(73) Assignee: INSTITUTE FOR INFORMATION INDUSTRY, Taipei (TW)

( * ) Notice: Subject to any disclaimer, the term of this patent is extended or adjusted under 35 U.S.C. 154(b) by 200 days.

(21) Appl. No.: 14/046,500

(22) Filed: Oct. 4, 2013

(65) Prior Publication Data

US 2015/0097970 A1    Apr. 9, 2015

(51) Int. Cl.
*H04N 17/00*    (2006.01)
(52) U.S. Cl.
CPC .................................. *H04N 17/004* (2013.01)
(58) Field of Classification Search
CPC ... H04N 17/00; H04N 17/004; H04N 17/002; H04N 17/04; H04N 5/21; H04N 5/211
USPC ......... 348/192, 193, 180, 497, 607, 608, 613, 348/614
IPC .............................................. H04N 17/00, 5/21
See application file for complete search history.

(56) References Cited

U.S. PATENT DOCUMENTS

| 5,926,226 A * | 7/1999 | Proctor et al. ........... 375/240.22 |
| 2008/0198234 A1 | 8/2008 | Nilsson et al. |
| 2013/0021530 A1* | 1/2013 | Takahashi ..................... 348/706 |
| 2013/0297466 A1* | 11/2013 | Rossato et al. ........... 375/240.25 |

OTHER PUBLICATIONS

Zeng, Y-C. et al., "Recognition of Frame Quality Degradation Using LDA-Based Classification", Internet Citation, (printed on Oct. 3, 2013), 8 pages.
Zeng, Y-C. et al., <<Automatic Recognition of Frame Quality Degradation for Inspection of Surveillance Camera >>, Internet Citation, (printed on Oct. 3, 2013), 9 pages.

* cited by examiner

*Primary Examiner* — Sherrie Hsia
(74) *Attorney, Agent, or Firm* — Nixon & Vanderhye P.C.

(57) ABSTRACT

A video signal fault detection system includes a front-end device and a back-end device. The back-end device includes: a quality evaluation unit generating a quality evaluation result associated with successive image frames captured by an image capturing device of the front-end device and transmitted through a transmission channel; a recognition unit generating, based on the quality evaluation result, a recognition output indicating a non-corruption condition or a corruption type of each transmitted image frame; and an inference unit inferring, based on a predetermined lookup table and a determination output generated based on the recognition output, whether each of the transmission channel and the image capturing device is normal or not.

16 Claims, 3 Drawing Sheets

VIDEO SIGNAL FAULT DETECTION SYSTEM CAPABLE OF INFERENCE OF ABNORMAL COMPONENTS

BACKGROUND OF THE INVENTION

1. Field of the Invention

This invention relates to video signal fault detection, and more particularly to a video signal fault detection system capable of inferring whether each of a transmission channel and a plurality of components of an image capturing device is normal or not.

2. Description of the Related Art

In a video signal fault detection method disclosed in U.S. Patent Application Publication No. 2008/0198234, a specific type of fault in a video signal, i.e., signal loss, is detected and notified to a user by comparing each image frame of the video signal with a fixed image frame, incrementing a count of a counter when a difference between the image frames is below a threshold, indicating a possible occurrence of a fault, and generating an alarm signal when the count of the counter exceeds a predetermined count. In other words, loss of the video signal is detected by incrementing the count of the counter whenever the difference exceeds the threshold.

However, the aforesaid method can neither identify different types of faults other than signal loss, nor infer causes resulting in the faults. Therefore, there is still room for improvement.

SUMMARY OF THE INVENTION

Therefore, an object of the present invention is to provide a video signal fault detection system that can overcome the aforesaid drawbacks associated with the prior art.

According to this invention, a video signal fault detection system comprises a front-end device and a back-end device. The front-end device includes an image capturing device for capturing a number (N) of image frames of a scene in sequence. The image capturing device includes a plurality of components that cooperate to obtain the image frames. The back-end device includes a quality evaluation unit, a recognition unit, a determination unit and an inference unit. The quality evaluation unit receives a number (N) of transmitted image frames, which correspond respectively to the image frames captured by said image capturing device of said front-end device and which are transmitted from said front-end device to said back-end device through a transmission channel. The quality evaluation unit evaluates a plurality of quality parameters for each of the transmitted image frames so as to generate a quality evaluation result that is associated with the transmitted image frames and that is composed of the quality parameters thus evaluated for all of the transmitted image frames. The recognition unit is coupled to the quality evaluation unit for receiving the quality evaluation result therefrom. Based on the quality evaluation result, the recognition unit determines whether an $i^{th}$ one of the transmitted image frames is corrupted, where $1 \leq i \leq N$, and recognizes, upon determining that the $i^{th}$ one of the transmitted image frames is corrupted, a corruption type of the $i^{th}$ one of the transmitted image frames. The recognition unit generates a recognition output that corresponds to the $i^{th}$ one of the transmitted image frames and that indicates a non-corruption condition when the $i^{th}$ one of the transmitted image frames is determined to be non-corrupted or that indicates the corruption type when the $i^{th}$ one of the transmitted image frames is determined to be corrupted. The determination unit is coupled to the recognition unit for receiving the recognition output therefrom. The determination unit generates, based on at least the recognition output, a determination output that is associated with an abnormal condition of the image capturing device of the front-end device and/or the transmission channel, or a normal condition of the image capturing device of the front-end device and the transmission channel. The inference unit is coupled to the determination unit for receiving the determination output therefrom. The inference unit generates, based on the determination output and a predetermined lookup table, an inference output that indicates at least one of the transmission channel and the components of the image capturing device as being inferred to be abnormal when the determination output is associated with the abnormal condition of the image capturing device and/or the transmission channel, or that indicates the normal condition of the image capturing device and the transmission channel when the determination output is associated with the normal condition of the image capturing device and the transmission channel. The predetermined lookup table contains relationships between a plurality of different predetermined corruption types and the components of the image capturing device and the transmission channel. The corruption type is one of the predetermined corruption types.

BRIEF DESCRIPTION OF THE DRAWINGS

Other features and advantages of the present invention will become apparent in the following detailed description of the preferred embodiments of this invention, with reference to the accompanying drawings, in which.

DETAILED DESCRIPTION OF THE PREFERRED EMBODIMENTS

Figure 1:
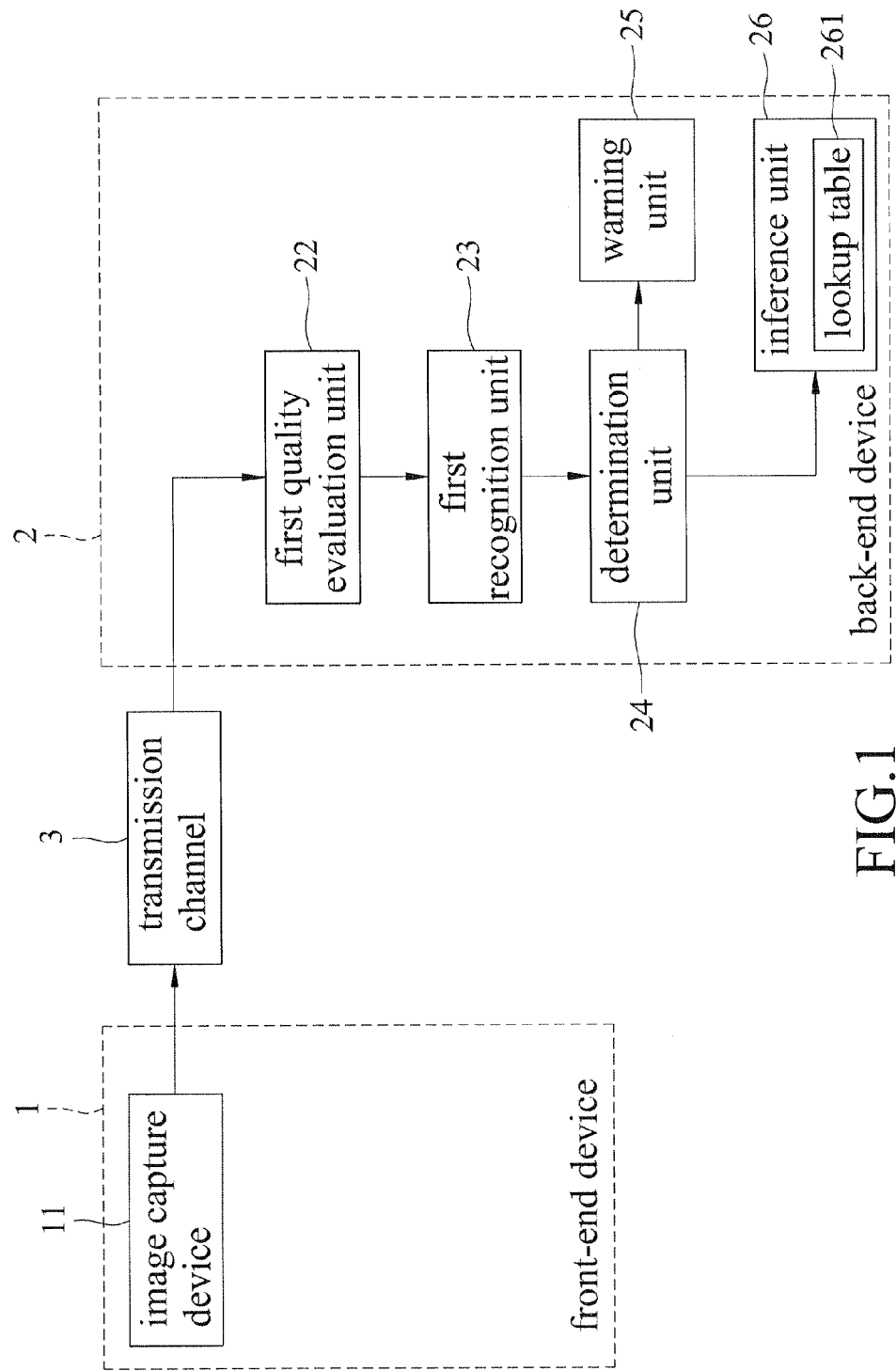
FIG. 1 is a schematic block diagram illustrating the first preferred embodiment of a video signal fault detection system according to this invention.

Referring to FIG. 1, the first preferred embodiment of a video signal fault detection system according to this invention is shown to include a front-end device 1 and a back-end device 2.

Figure 2:
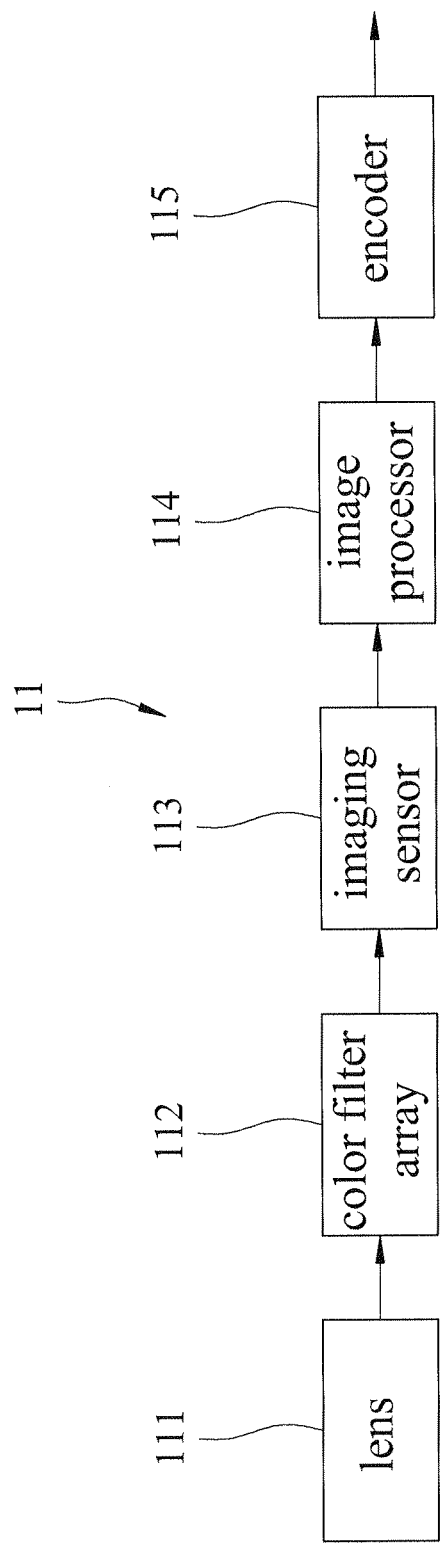
FIG. 2 is a schematic block diagram illustrating an image capturing device of a front-end device of the first preferred embodiment.

The front-end device 1 includes an image capturing device 11 for capturing a number (N) of image frames of a scene in sequence. The image capturing device 11 includes a plurality of components that are cooperatively configured to obtain the image frames. As shown in FIG. 2, in this embodiment, the components of the image capturing device 11 include a lens 111, a color filter array 112, an imaging sensor 113, an image processor 114 and an encoder 115.

The back-end device 2 includes a first quality evaluation unit 22, a first recognition unit 23, a determination unit 24, a warning unit 25 and an inference unit 26.

The first quality evaluation unit 22 receives a number (N) of transmitted image frames, which correspond respectively to the image frames captured by the image capturing device 11 of the front-end device 1 and which are transmitted from the front-end device 1 to the back-end device 2 through a transmission channel 3 therebetween, and evaluates a plurality of quality parameters for each of the transmitted image frames so as to generate a first quality evaluation result associated with the transmitted image frames and composed of the quality parameters thus evaluated for all of the transmitted image frames.

In this embodiment, the quality parameters include, but are not limited to, a first mean of structural similarity (SSIM), a second mean of SSIM, a variation of intensity difference, a minimum of block correlation, a mean of a red component, a mean of a green component, and a mean of a blue component.

The first mean of SSIM of a $k^{th}$ one of the transmitted image frames ($f_{1,k}$) is evaluated with respect to a predetermined reference image frame. The second mean of SSIM of the $k^{th}$ one of the transmitted image frames ($f_{2,k}$) is evaluated with respect to a $(k-1)^{th}$ one of the transmitted image frames. The first and second means of SSIM of the $k^{th}$ one of the transmitted image frames ($f_{1,k}$, $f_{2,k}$) are obtained by the following equations:

$$f_{1,k} = MSSIM(X_r, X_k),$$

$$f_{2,k} = MSSIM(X_{k-1}, X_k),$$

$$MSSIM(X, Y) = \frac{1}{HW} \sum_{p=1}^{W} \sum_{q=1}^{H} SSIM(\Omega_{p,q}, \Psi_{p,q}),$$

and $$SSIM(x, y) = \frac{(2\mu_x \mu_y + c_1)(2\sigma_{xy} + c_2)}{(\mu_x^2 + \mu_y^2 + c_1)(\sigma_x^2 + \sigma_y^2 + c_2)},$$

where $X_r$ is the reference image frame, $X_{k-1}$ and $X_k$ are respectively the $(k-1)^{th}$ and $k^{th}$ ones of the transmitted image frames, each of the transmitted image frames and the reference image frame is divided into H×W blocks, H and W are integers greater than one, $\Omega_{p,q}$ is a $(p,q)^{th}$ one of the blocks of the image frame (X), $\Psi_{p,q}$ is a $(p,q)^{th}$ one of the blocks of the image frame (Y), $\mu_x$ is a mean intensity of a block (x), $\mu_y$ is a mean intensity of a block (y), $\sigma_x$ is a variance of the block (x), $\sigma_y$ is a variance of the block (y), $\sigma_{xy}$ is a covariance of the blocks (x, y), and $c_1$ and $c_2$ are predetermined variables.

The variation of intensity difference of the $k^{th}$ one of the transmitted image frames ($f_{3,k}$) is obtained by the following equation:

$$f_{3,k} = \frac{-\sum_{m=1}^{3} m \sum_{m=1}^{3} \delta_{m,k} + 3 \sum_{m=1}^{3} m \delta_{m,k}}{3 \sum_{m=1}^{3} m^2 - \left(\sum_{m=1}^{3} m\right)^2},$$

where $$\delta_{m,k} = \frac{1}{\sqrt{HW}} \|I_{m,k} - I_{m-1,k}\|_2,$$

$$I_{m,k} = I_{0,k} * \Phi_m,$$

$$m = \{1, 2, 3\}, I_{0,k}$$

is an initial intensity of the $k^{th}$ one of the transmitted image frames, $\phi_m$ is a two-dimensional average kernel having a size of $(2m+1) \times (2m+1)$, $I_{m,k}$ is an m-level blurred intensity of the $k^{th}$ one of the transmitted image frames, and $\|a\|_2$ is an $L^2$ norm of a variable (a).

The minimum of block correlation of the k one of the transmitted image frames ($f_{4,k}$) is evaluated with respect to the $(k-1)^{th}$ one of the transmitted image frames, and is obtained by the following equations:

$$\gamma_{p,q,k} = \frac{E[(B_{p,q,k-1} - \mu_{p,q,k-1})(B_{p,q,k} - \mu_{p,q,k})]}{\sqrt{E[(B_{p,q,k-1} - \mu_{p,q,k-1})^2]} \sqrt{E[(B_{p,q,k} - \mu_{p,q,k})^2]}},$$

and $$f_{4,k} = \min_{1 \leq p,q \leq C} |\gamma_{p,q,k}|,$$

where E(a) is an expectation of a variable (a), each of the transmitted image frames is divided into C×C non-overlapped blocks, C is an integer greater than one, $B_{p,q,k-1}$ is a $(p,q)^{th}$ one of the blocks of the $(k-1)^{th}$ one of the transmitted image frames, $B_{p,q,k}$ is a $(p,q)^{th}$ one of the blocks of the $k^{th}$ one of the transmitted image frames, $\mu_{p,q,k-1}$ is a mean intensity of the $(p,q)^{th}$ one of the blocks of the $(k-1)^{th}$ one of the transmitted image frames, and $\mu_{p,q,k}$ is a mean intensity of the $(p,q)^{th}$ one of the blocks of the $k^{th}$ one of the transmitted image frames.

The first recognition unit 23 is coupled to the first quality evaluation unit 22 for receiving the first quality evaluation result therefrom. Based on the first quality evaluation result, the first recognition unit 23 determine whether an $i^{th}$ transmitted image frame is corrupted, where $1 \leq i \leq N$, and recognizes, upon determining that the $i^{th}$ transmitted image frame is corrupted, a first corruption type of the $i^{th}$ transmitted image frame. The first recognition unit 23 generates a first recognition output that corresponds to the $i^{th}$ transmitted image frame and that indicates a non-corruption condition when the $i^{th}$ transmitted image frame is determined to be non-corrupted or that indicates the first corruption type when the $i^{th}$ transmitted image frame is determined to be corrupted.

In this embodiment, the first corruption type is one of a plurality of different predetermined corruption types, which include signal loss, color loss, local alteration, global alteration and periodic intensity change. Operation of the first recognition unit 23 is elaborated as follows. First, the first recognition unit 23 determines, based on all of the quality parameters associated with the $i^{th}$ transmitted image frame, whether signal loss occurs in the $i^{th}$ transmitted image frame. If the result is affirmative, the first corruption type indicated by the first recognition output that corresponds to the $i^{th}$ transmitted image frame is signal loss. Otherwise, the first recognition unit 23 proceeds to determine, based on all of the quality parameters associated with the $i^{th}$ transmitted image frame, whether color loss occurs in the $i^{th}$ transmitted image frame. If the result is affirmative, the first corruption type indicated by the first recognition output that corresponds to the $i^{th}$ transmitted image frame is color loss. Otherwise, the first recognition unit 23 proceeds to determine, based on the variation of intensity difference and the minimum of block correlation of the $i^{th}$ transmitted image frame ($f_{3,i}$, $f_{4,i}$), whether local alteration occurs in the $i^{th}$ transmitted image frame. If the result is affirmative, the first corruption type indicated by the first recognition output that corresponds to the $i^{th}$ transmitted image frame is local alteration. Otherwise, the first recognition unit 23 proceeds to determine, based on the first mean of SSIM and the variation of intensity difference of the $i^{th}$ one of the transmitted image frames ($f_{1,i}$, $f_{3,i}$), whether global alteration occurs in the $i^{th}$ transmitted image frame. If the result is affirmative, the first corruption type indicated by the first recognition output that corresponds to the $i^{th}$ transmitted image frame is global alteration. Moreover, the first recognition unit 23 determines, based on the first mean of SSIM, the variation of intensity difference, the average intensity of the red component, the average intensity of the green component and the average intensity of the blue component of each of L consecutive transmitted image frames, which contain the $i^{th}$ transmitted image frame, whether periodic intensity change occurs in the $i^{th}$ transmitted image frame, wherein $2 \leq L \leq N$. If the result is affirmative, the first corruption type indicated by the first recognition output that corresponds to the $i^{th}$ transmitted image frame is periodic intensity change. Finally, if it is determined by the first recognition unit 23 that none of the predetermined corruption types occurs in the $i^{th}$ transmitted image frame, the first recognition output indicates the non-corruption condition.

The determination unit 24 is coupled to the first recognition unit 23 for receiving therefrom the first recognition output associated with each image frame. In this embodiment, the determination unit 24 takes the first recognition output as a determination output. It is noted herein that when the first recognition output indicates the first corruption type, it means that an abnormal condition might have occurred in the image capturing device 11 of the front-end device 1 and/or the transmission channel 3, and the determination output is therefore associated with an abnormal condition of the image capturing device 11 of the front-end device 1 and/or the transmission channel 3. On the other hand, when the first recognition output indicates the non-corruption condition, it means that operations of the image capturing device 11 and the transmission channel 3 should be normal, and therefore the determination output is associated with a normal condition of the image capturing device 11 of the front-end device 1 and the transmission channel 3. The determination unit 24 generates a control signal when the determination output is associated with the abnormal condition.

The warning unit 25 is coupled to the determination unit 24 for receiving the control signal therefrom, and generates, in response to receipt of the control signal, a warning output, such as sound or light.

The inference unit 26 is coupled to the determination unit 24 for receiving the determination output therefrom, and pre-stores a predetermined lookup table 261 including relationships between the predetermined corruption types and the components of the image capturing device 11 and the transmission channel 3. The inference unit 26 generates, based on the determination output and the lookup table 261, an inference output that indicates at least one of the transmission channel 3 and the components of the image capturing device 11 as being inferred to be abnormal when the determination output is associated with the abnormal condition of the image capture device 11 of the front-end device 1 and/or the transmission channel 3, or that indicates the normal condition of the image capturing device 11 and the transmission channel 3 when the determination output is associated with the normal condition.

Table 1 illustrates an example of the lookup table 261. In this embodiment, when the determination output is associated with the abnormal condition, i.e., when the first recognition output indicates the first corruption type, as seen from Table 1, if the first corruption type is signal loss, the inference output indicates the imaging sensor 113 of the image capturing device 11 and the transmission channel 3 as being inferred by the inference unit 26 to be abnormal; if the first corruption type is color loss, the inference output indicates the color filter array 112 and the encoder 115 of the image capturing device 11 as being inferred by the inference unit 26 to be abnormal; if the first corruption type is local alteration, the inference output indicates the lens 111, the imaging sensor 113 and the encoder 115 of the image capturing device 11 as being inferred by the inference unit 26 to be abnormal; if the first corruption type is global alteration, the inference output indicates the lens 111, the imaging sensor 113, the image processor 114 and the encoder 115 of the image capturing device 11 as being inferred by the inference unit 26 to be abnormal; and if the first corruption type is periodic intensity change, the inference output indicates the imaging sensor 113 of the image capturing device 11 as being inferred by the inference unit 26 to be abnormal. When the determination output is associated with the normal condition, i.e., when the first recognition output indicates the non-corruption condition, the inference output indicates the normal condition of the image capturing device 11 and the transmission channel 3.

TABLE 1

|  | signal loss | color loss | local alteration | global alteration | periodic intensity change |
| --- | --- | --- | --- | --- | --- |
| lens |  |  | • | • |  |
| color filter array |  | • |  |  |  |
| imaging sensor | • |  | • | • | • |
| image processor |  |  |  | • |  |
| encoder |  |  | • | • |  |
| transmission channel | • |  |  |  |  |

Figure 3:
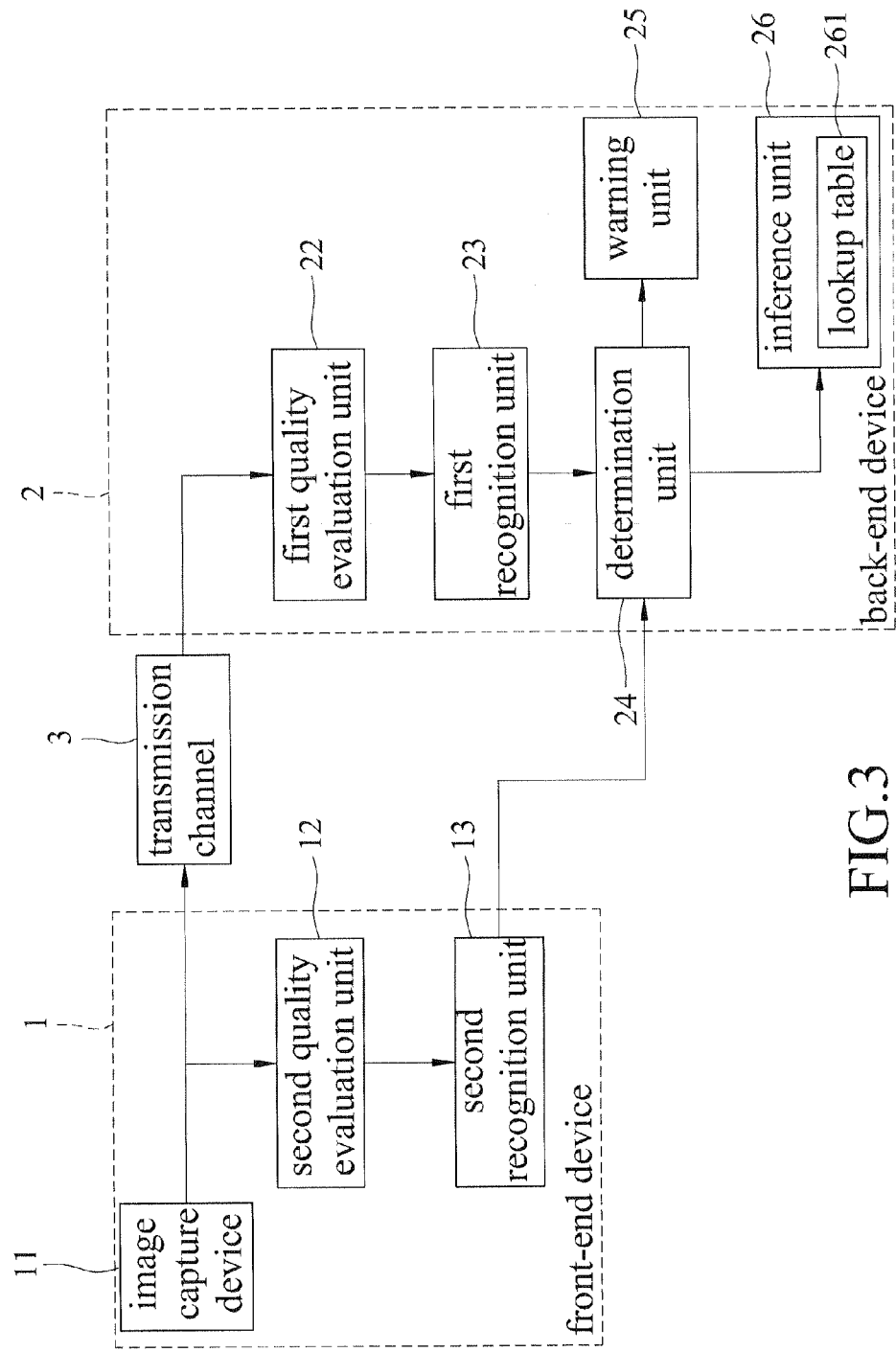
FIG. 3 is a schematic block diagram illustrating the second preferred embodiment of a video signal fault detection system according to this invention.

FIG. 3 illustrates the second preferred embodiment of a video signal fault detection system according to this invention, which is a modification of the first preferred embodiment. Unlike the first preferred embodiment, the front-end device 1 further includes a second quality evaluation unit 12 and a second recognition unit 13 that are similar to the first quality evaluation unit 22 and the first recognition unit 23 of the back-end device 2, respectively.

The second quality evaluation unit 12 is coupled to the image capturing device 11 for receiving the image frames captured thereby, and evaluates a plurality of quality parameters for each of the image frames so as to generate a second quality evaluation result associated with the image frames and composed of the quality parameters thus evaluated for all of the image frames.

The second recognition unit 13 is coupled to the second quality evaluation unit 12 for receiving the second quality evaluation result therefrom. Based on the second quality evaluation result, the second recognition unit 13 determines whether an $i^{th}$ image frame is corrupted and recognizes, upon determining that the $i^{th}$ image frame is corrupted, a second corruption type of the $i^{th}$ image frame, which is one of the predetermined corruption types mentioned previously. The second recognition unit 13 generates a second recognition output that corresponds to the $i^{th}$ image frame and that indicates a non-corruption condition when the $i^{th}$ image frame is determined to be non-corrupted or the second corruption type when the $i^{th}$ image frame is determined to be corrupted.

The determination unit 24 of the back-end device 2 is further coupled to the second recognition unit 13 of the front-end device 1 for receiving the second recognition output therefrom. In this embodiment, the determination unit 24 generates the determination output based on both the first and second recognition outputs.

More specifically, the determination unit 24 compares the first and second recognition outputs, and generates the determination output with reference to the first and second recognition outputs and the result of the comparison.

When the result of the comparison indicates that the first and second recognition outputs are the same, the determination output generated by the determination unit 24 includes either one of the first and second recognition outputs and an indication that the transmission channel 3 is normal. In this case, when the first and second recognition outputs respectively indicate the first and second corruption types, which are identical to each other, it means that an abnormal condition might have occurred in the image capturing device 11 of the front-end device 1, and not in the transmission channel 3. In other words, the determination output is associated with the abnormal condition of the image capturing device 11 of the front-end device 1 only. As a result, at least one of the components of the image capturing device 11 of the front-end device 1 will be inferred by the inference unit 26 to be abnormal. For example, if the first and second recognition outputs both indicate signal loss, the inference output generated by the inference unit 26 would indicate only the imaging sensor 113 of the image capturing device 11 as being inferred to be abnormal.

When the result of the comparison indicates that the first and second recognition outputs differ from each other and the first recognition output indicates the non-corruption condition, the determination unit 24 takes the first recognition output as the determination output, which is therefore associated with the normal condition of the image capturing device 11 and the transmission channel 3. Consequently, the inference output generated by the inference unit 26 indicates the normal condition of the image capturing device 11 and the transmission channel 3.

When the result of the comparison indicates that the first and second recognition outputs differ from each other and the first recognition output indicates the first corruption type, the determination output generated by the determination unit 24 includes the second recognition output and an indication that the transmission channel 3 is abnormal. In other words, the determination output is associated with the abnormal condition of the image capturing device 11 of the front-end device 1 in addition to an abnormal condition of the transmission channel 3. Therefore, the transmission channel 3, along with at least one component of the image capturing device 11 of the front-end device 1 will be inferred to be abnormal as indicated by the inference output. For example, if the first and second recognition outputs indicate the global and local alterations, respectively, the inference output would indicate the lens 111, the imaging sensor 113 and the encoder 115 of the image capturing device 11 and the transmission channel 3 as being inferred to be abnormal.

The following are some of the advantages attributed to the video signal fault detection system of the present invention:

1. Due to the first and second evaluation units 22, 12 and the first and second recognition units 23, 13, additional different corruption types other than signal loss can be recognized.

2. When corruption occurs in any image frame captured by the image capturing device 11 of the front-end device 1 and/or transmitted to the back-end device 2 via the transmission channel 3, the video signal fault detection system can effectively infer abnormal one(s) of the components of the image capturing device 11 of the front-end device 1 and the transmission channel 3.

While the present invention has been described in connection with what are considered the most practical and preferred embodiments, it is understood that this invention is not limited to the disclosed embodiments but is intended to cover various arrangements included within the spirit and scope of the broadest interpretation and equivalent arrangements.

That is claimed is:

1. A video signal fault detection system comprising:
    a front-end device including
        an image capturing device for capturing a number (N) of image frames of a scene in sequence, said image capturing device including a plurality of components that cooperate to obtain the image frames; and
    a back-end device including
        a first quality evaluation unit receiving a number (N) of transmitted image frames, which correspond respectively to the image frames captured by said image capturing device of said front-end device and which are transmitted from said front-end device to said back-end device through a transmission channel, said first quality evaluation unit evaluating a plurality of quality parameters for each of the transmitted image frames so as to generate a first quality evaluation result that is associated with the transmitted image frames and that is composed of the quality parameters thus evaluated for all of the transmitted image frames,
        a first recognition unit coupled to said first quality evaluation unit for receiving the first quality evaluation result therefrom, wherein based on the first quality evaluation result, said first recognition unit determines whether an $i^{th}$ one of the transmitted image frames is corrupted, where $1 \leq i \leq N$, and recognizes, upon determining that the $i^{th}$ one of the transmitted image frames is corrupted, a first corruption type of the $i^{th}$ one of the transmitted image frames, said first recognition unit generating a first recognition output that corresponds to the $i^{th}$ one of the transmitted image frames and that indicates a non-corruption condition when the $i^{th}$ one of the transmitted image frames is determined to be non-corrupted or that indicates the first corruption type when the $i^{th}$ one of the transmitted image frames is determined to be corrupted,
        a determination unit coupled to said first recognition unit for receiving the first recognition output therefrom, and generating, based on at least the first recognition output, a determination output that is associated with an abnormal condition of said image capturing device of said front-end device and/or the transmission channel, or with a normal condition of said image capturing device of said front-end device and the transmission channel, and
        an inference unit coupled to said determination unit for receiving the determination output therefrom, and generating, based on the determination output and a predetermined lookup table, an inference output that indicates at least one of the transmission channel and said components of said image capturing device as being inferred to be abnormal when the determination output is associated with the abnormal condition of said image capturing device and/or the transmission channel, or that indicates the normal condition of said image capturing device and the transmission channel when the determination output is associated with the normal condition of said image capturing device and the transmission channel, the predetermined lookup table containing relationships between a plurality of different predetermined corruption types and said components of said image capturing device and the transmission channel, the first corruption type being one of the predetermined corruption types.

2. The video signal fault detection system of claim 1, wherein, when said determination unit of said back-end device generates the determination output based only on the first recognition output, said determination unit takes the first recognition output as the determination output, the determination output being associated with the abnormal condition of said image capturing device of said front-end device and/or the transmission channel when the first recognition output indicates the first corruption type, and being associated with the normal condition of said image capturing device of said front-end device and the transmission channel when the first recognition output indicates the non-corruption condition.

3. The video signal fault detection system of claim 1, wherein:

said front-end device further includes a second quality evaluation unit coupled to said image capturing device for receiving the image frames captured thereby, said second quality evaluation unit evaluating a plurality of quality parameters for each of the image frames so as to generate a second quality evaluation result that is associated with the image frames and that is composed of the quality parameters thus evaluated for all of the image frames, and a second recognition unit coupled to said second quality evaluation unit for receiving the second quality evaluation result therefrom, wherein based on the second quality evaluation result, said second recognition unit determines whether an $i^{th}$ one of the image frames is corrupted and recognizes, upon determining that the $i^{th}$ one of the image frames is corrupted, a second corruption type of the $i^{th}$ one of the image frames, said second recognition unit generating a second recognition output that corresponds to the $i^{th}$ one of the image frames and that indicates a non-corruption condition when the $i^{th}$ one of the image frames is determined to be non-corrupted or that indicates the second corruption type when the $i^{th}$ one of the image frames is determined to be corrupted, the second corruption type being one of the predetermined corruption types; and said determination unit of said back-end device is further coupled to said second recognition unit of said front-end device for receiving the second recognition output therefrom, and generates the determination output based on both the first and second recognition outputs.

4. The video signal fault detection system of claim 3, wherein said determination unit of said back-end device further compares the first and second recognition outputs, and generates the determination output with reference to the first and second recognition outputs and the result of the comparison.

5. The video signal fault detection system of claim 4, wherein, when the result of the comparison indicates that the first and second recognition outputs are the same, the determination output generated by said determination unit of said back-end device includes the first or second recognition output and an indication that the transmission channel is normal.

6. The video signal fault detection system of claim 5, wherein, when the first and second recognition outputs respectively indicate the first and second corruption types, which are identical to each other, the determination output is associated with the abnormal condition of said image capturing device of said front-end device only, and the inference output generated by said inference unit indicates at least one of said components of said image capturing device as being inferred to be abnormal.

7. The video signal fault detection system of claim 4, wherein, when the result of the comparison indicates that the first and second recognition outputs differ from each other and the first recognition output indicates the non-corruption condition, said determination unit takes the first recognition output as the determination output, which is thus associated with the normal condition of said image capturing device and the transmission channel, and the inference output generated by said inference unit indicates the normal condition of said image capturing device and the transmission channel.

8. The video signal fault detection system of claim 4, wherein, when the result of the comparison indicates that the first and second recognition outputs differ from each other and the first recognition output indicates the first corruption type, the determination output generated by said determination unit includes the second recognition output and an indication that the transmission channel is abnormal, and the inference output generated by said inference unit indicates the transmission channel and at least one of said components of said image capturing device as being inferred to be abnormal.

9. The video signal fault detection system of claim 1, wherein the lookup table is pre-stored in said inference unit of said back-end device.

10. The video signal fault detection system of claim 1, wherein:

said determination unit of said back-end device further generates a control signal when the determination output is associated with the abnormal condition of said image capturing device and/or the transmission channel; and said back-end device further includes a warning unit coupled to said determination unit for receiving the control signal therefrom, and generating a warning output in response to receipt of the control signal.

11. The video signal fault detection system of claim 1, wherein the quality parameters evaluated by said first quality evaluation unit of said back-end device for each of the transmitted image frames include a first mean of structural similarity (SSIM) and a second mean of SSIM, the first and second means of SSIM of a $k^{th}$ one of the transmitted image frames ($f_{1,k}$, $f_{2,k}$) being obtained by the following equations:

$$f_{1,k} = MSSIM(X_r, X_k),$$

$$f_{2,k} = MSSIM(X_{k-1}, X_k),$$

$$MSSIM(X, Y) = \frac{1}{HW} \sum_{p=1}^{W} \sum_{q=1}^{H} SSIM(\Omega_{p,q}, \Psi_{p,q}),$$

and $$SSIM(x, y) = \frac{(2\mu_x\mu_y + c_1)(2\sigma_{xy} + c_2)}{(\mu_x^2 + \mu_y^2 + c_1)(\sigma_x^2 + \sigma_y^2 + c_2)},$$

where $X_r$ is a predetermined reference image frame, $X_{k-1}$ and $X_k$ are respectively a $(k-1)^{th}$ one and the $k^{th}$ one of the transmitted image frames, each of the transmitted image frames and the reference image frame is divided into a number (H×W) of blocks, H and W are integers greater than one, $\Omega_{p,q}$ is a $(p,q)^{th}$ one of the blocks of the image frame (X), $\Psi_{p,q}$ is a $(p,q)^{th}$ one of the blocks of the image frame (Y), $\mu_x$ is a mean intensity of a block (x), $\mu_y$ is a mean intensity of a block (y), $\sigma_x$ is a variance of the block (x), $\sigma_y$ is a variance of the block (y), $\sigma_{xy}$ is a covariance of the blocks (x, y), and $c_1$ and $c_2$ are predetermined variables.

12. The video signal fault detection system of claim 1, wherein the quality parameters evaluated by said first quality evaluation unit of said back-end device for each of the transmitted image frames include variation of intensity difference, the variation of intensity difference of a $k^{th}$ one of the transmitted image frames ($f_{3,k}$) being obtained by the following equation:

$$f_{3,k} = \frac{-\sum_{m=1}^{3} m \sum_{m=1}^{3} \delta_{m,k} + 3\sum_{m=1}^{3} m\delta_{m,k}}{3\sum_{m=1}^{3} m^2 - \left(\sum_{m=1}^{3} m\right)^2},$$

where $$\delta_{m,k} = \frac{1}{\sqrt{HW}} \|I_{m,k} - I_{m-1,k}\|_2,$$

$$I_{m,k} = I_{0,k} * \Phi_m,$$

$$m = \{1, 2, 3\}, I_{0,k}$$

is an initial intensity of the $k^{th}$ one of the transmitted image frames, $\Phi_m$ is a two-dimensional average kernel having a size of $(2m+1) \times (2m+1)$, $I_{m,k}$ is an m-level blurred intensity of the $k^{th}$ one of the transmitted image frames, and $\|a\|_2$ is an $L^2$ norm of a variable (a).

13. The video signal fault detection system of claim 1, wherein the quality parameters evaluated by said first quality evaluation unit of said back-end device for each of the transmitted image frames include minimum of block correlation, the minimum of block correlation of a $k^{th}$ one of the transmitted image frames ($f_{4,k}$) being obtained by the following equations:

$$\gamma_{p,q,k} = \frac{E[(B_{p,q,k-1} - \mu_{p,q,k-1})(B_{p,q,k} - \mu_{p,q,k})]}{\sqrt{E[(B_{p,q,k-1} - \mu_{p,q,k-1})^2]} \sqrt{E[(B_{p,q,k} - \mu_{p,q,k})^2]}},$$

and $$f_{4,k} = \min_{1 \leq p,q \leq C} |\gamma_{p,q,k}|,$$

where E (a) is an expectation of a variable (a), each of the transmitted image frames is divided into a number (C×C) of non-overlapped blocks, C is an integer greater than one, $B_{p,q,k-1}$ is a $(p,q)^{th}$ one of the blocks of a $(k-1)^{th}$ one of the transmitted image frames, $B_{p,q,k}$ is a $(p,q)^{th}$ one of the blocks of the $k^{th}$ one of the transmitted image frames, $\mu_{p,q,k-1}$ is a mean intensity of the $(p,q)^{th}$ one of the blocks of the $(k-1)^{th}$ one of the transmitted image frames, and $\mu_{p,q,k}$ is a mean intensity of the $(p,q)^{th}$ one of the blocks of the $k^{th}$ one of the transmitted image frames.

14. The video signal fault detection system of claim 1, wherein the quality parameters evaluated by said first quality evaluation unit of said back-end device for each of the transmitted image frames include a mean of a red component, a mean of a green component, and a mean of a blue component.

15. The video signal fault detection system of claim 1, wherein said components of said image capturing device of said front-end device include a lens, a color filter array, an imaging sensor, an image processor and an encoder.

16. The video signal fault detection system of claim 15, wherein the predetermined corruption types include signal loss, color loss, local alteration, global alteration, and periodic intensity change.

* * * * *